(12) United States Patent
Braunecker et al.

(10) Patent No.: US 7,742,176 B2
(45) Date of Patent: Jun. 22, 2010

(54) METHOD AND SYSTEM FOR DETERMINING THE SPATIAL POSITION OF A HAND-HELD MEASURING APPLIANCE

(75) Inventors: Bernhard Braunecker, Rebstein (CH); Bernhard Gächter, Balgach (CH); Beat Aebischer, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 839 days.

(21) Appl. No.: 10/595,185

(22) PCT Filed: Sep. 21, 2004

(86) PCT No.: PCT/EP2004/010571

§ 371 (c)(1),
(2), (4) Date: Jul. 17, 2006

(87) PCT Pub. No.: WO2005/031259

PCT Pub. Date: Apr. 7, 2005

(65) Prior Publication Data

US 2007/0064246 A1    Mar. 22, 2007

(30) Foreign Application Priority Data

Sep. 22, 2003   (EP) .................................. 03021134

(51) Int. Cl.
*G01B 11/14* (2006.01)
(52) U.S. Cl. ........................... 356/614; 356/3; 356/140; 356/622
(58) Field of Classification Search ............ 356/3–5.09, 356/614, 622, 623, 139.1, 140
See application file for complete search history.

(56) References Cited

U.S. PATENT DOCUMENTS

| 5,011,288 | A | 4/1991 | Noji et al. |
| 5,260,770 | A | 11/1993 | Tsuzuki et al. |
| 5,467,273 | A | 11/1995 | Faibish et al. |
| 5,757,499 | A | 5/1998 | Eaton |
| 6,400,447 | B1 | 6/2002 | Lamm et al. |
| 6,734,952 | B2 * | 5/2004 | Benz et al. ............... 356/141.1 |
| 7,081,917 | B2 * | 7/2006 | Shimoyama et al. ........ 348/135 |
| 2002/0049530 | A1 | 4/2002 | Poropat |
| 2003/0169414 | A1 | 9/2003 | Hammerer et al. |

FOREIGN PATENT DOCUMENTS

EP    0341890    11/1989

(Continued)

*Primary Examiner*—Gregory J Toatley, Jr.
*Assistant Examiner*—Iyabo S Alli
(74) *Attorney, Agent, or Firm*—Workman Nydegger

(57) ABSTRACT

The aim of the invention is to determine the actual position and/or actual orientation of a measuring appliance (4*b*). To this end, at least two reference points (2*b*') lying in a spatial segment (5') scanned by a laser beam are detected and measured in terms of the distance thereinbetween and the inclination angle thereof. The actual position of the measuring appliance (4*b*) can be deduced from the known positions of said reference points (2*b*') arranged in a detectable manner and the associated distances and inclination angle thereof. The detection, monitoring and measuring of the reference points is carried out by the measuring appliance (4*b*) in an automated manner, the measuring appliance (4*b*) and specifically embodied elements associated with the reference points (2*b*') forming a local positioning and/or orientation measuring system. The inventive method and corresponding devices enable measurements to be carried out in a problem-free and automated manner, even in areas that cannot be accessed by other measuring systems.

46 Claims, 7 Drawing Sheets

FOREIGN PATENT DOCUMENTS

| | | |
|---|---|---|
| EP | 0468677 | 1/1992 |
| EP | 1424156 | 2/2004 |
| EP | 1424884 | 2/2004 |
| WO | WO82/01420 | 4/1982 |

\* cited by examiner

METHOD AND SYSTEM FOR DETERMINING THE SPATIAL POSITION OF A HAND-HELD MEASURING APPLIANCE

The invention relates to a method for determining the spatial position of a hand-held measuring appliance according to claim 1, a use of the method for correcting deviations of a positioning and orientation-measuring device based on inertial sensors, according to claim 14, a hand-held measuring appliance according to the precharacterizing clause of claim 15, a local position determination system according to claim 27 and a use of the method according to claim 29.

In many geodetic applications, methods and systems for position and/or orientation determination of a geodetic instrument are used. From a position determined by such a system, further measurements which are linked to the position and generally also require a knowledge of the spatial orientation of the measuring appliance are generally then carried out. For such applications, the 6 degrees of freedom of the hand-held measuring appliance have to be determined for unambiguously establishing the absolute spatial position. The problem thus comprises the determination of position and orientation as two fundamentally separately achievable tasks, which, however, have to be carried out in association for many applications. As a rule, both position and orientation of a hand-held measuring appliance are therefore required.

An example of systems for position determination are global positioning systems, such as, for example, GPS, GLONASS or the European Galileo system currently being established. These systems are based on the as far as possible undisturbed reception of satellite signals, which, however, may also be obstructed by obstacles and thus limited in their usability. In the immediate vicinity of obstacles, the reception of the signals may be limited or completely impossible owing to the obstructive effect of said obstacles, so that position determination using this system is no longer possible. These limitations relate in particular to measurements in interior rooms of buildings in which the reception of a number of satellites which is required for positioning can generally be ruled out. A further problem is that global positioning systems do not always provide the required accuracy of position determination or require a greater effort, for example by use of a reference station or longer measuring times.

The determination of the orientation of a measuring appliance using such systems is possible, for example, by the use of two receiving aerials. If the position of the baseline or of the aerials relative to the axis of the appliance is known, it is possible to conclude the orientation of the measuring appliance. In order to determine thereby the still undetermined rotation about the axis of the appliance, an inclination sensor can be used.

A further example is the position determination of a reflector-bearing instrument using a theodolite or tacheometer. By a direction and distance measurement with the tacheometer to the geodetic instrument, the position of the instrument too can be determined if the position of the tacheometer is known. In combination with automated target detection and target tracking, a quasi-continuous position determination can be achieved. A precondition for the measurement here is the visual link between the two components. If this link is interrupted, for example by growth or buildings in the field of view, the method of position determination fails. Furthermore, only one instrument at a time can be tracked by a motorised tacheometer, so that, for example in the case of many vehicles on a building site, a large number of theodolites also have to be used. The use of a large number of theodolites which cover virtually the entire area to be surveyed without gaps in the visible area is generally impractical owing to the cost in terms of equipment and personnel. Moreover, such a solution results in high complexity and demands constant communication for controlling the measuring process.

In order to permit the actual position as the current location of the instrument under all conditions with the required accuracy, methods are known which are based on a determination of the position of said instrument itself relative to objects known with regard to their position, as reference objects or reference points. An example of this is the classical method of trilinear surveying. If it is intended to derive actual positions for a geodetic instrument or a positioning device suitable for this purpose from a knowledge of reference points, the reference points must be established beforehand and surveyed with sufficient accuracy.

The determination of the actual position is subsequently effected by a measurement to the reference points, from which conclusions can be drawn about the location of the instrument itself or the actual position. In many cases, a geodetic instrument has only an ability for distance measurement, or a measurement of angles cannot be carried out with the required precision or speed. In these cases, the position determination must be carried out by distance measurements alone. For this purpose, the distances to a plurality of points of known position are measured, and the determination of the actual position can be effected by known methods as also used, for example, in photogrammetry. Correlation methods or correlation calculations are an example of this. The number of points required is dependent on the position thereof and the intended accuracy of the measurement. As a rule, however, apart from particularly favourable configurations, at least 3 or 4 points are required. If in addition an angle is to be taken into account, for example by additionally detecting the angle relative to the horizontal, the number of points can be reduced to two.

The number of points actually required in each case is dependent on the position of the known points and any possible limitations for reducing ambiguity. In the case of three distance measurements to the various reference points, a plane at which the actual position to be determined can be reflected is defined by the three known positions. Two possible positions arise as a solution, of which, however, one position is generally ruled out for plausibility reasons, for example because it would lie below the surface of the Earth, or on the basis of simple further information, such as, for example, the distinction between North and South, which can also be made by means of a simple magnetic compass. An unambiguous determination with three known points is possible if favourable geometric conditions are present. This is the case, for example, if the position sought lies on a connecting line between two known points.

Apart from the position, in principle the spatial orientation of a structure may also be determined by means of geodetic devices, by carrying out measurements from two or three points of the structure, although only 5 degrees of freedom can be determined by measurement from only two points. Owing to the spatial dimensions of hand-held appliances, however, such an approach is not practicable.

In spite of this fundamentally known possibility for determining an actual position, the procedure using geodetic instruments of the prior art is moreover prohibitively complicated and, owing to the necessary measurements, always requires an interruption of the activity otherwise taking place. In particular, it is not possible to carry out measurements constantly out of a continuing movement or even to use the determination of the actual position according to this principle for correcting errors of positioning systems of other types.

U.S. Pat. No. 5,467,273 discloses a robot system for movements in an extensive plane, which system determines the position and orientation of said system itself by reference to known, reflecting points. For this purpose, the robot system uses a scanner system movable about a vertical axis and having a telemeter which measures distance and angle to the reference points and determines the actual position therefrom.

Owing to the limitation of the movement in a plane, however, the determination of location and direction is not very complex here and cannot be directly applied to a three-dimensional problem. Moreover the accuracies required for controlling a robot system of this type are significantly lower than those of geodetic applications.

Of particular relevance here is the number of reference points required for a measurement with a specified accuracy. Said number should be as low as possible, particularly during initial setup and surveying of such points. In order to minimize the number of reference points required, a careful choice of the setup geometry and of the variables to be measured is therefore required.

An object of the present invention is to provide a method, an apparatus and a system which permits the determination of the actual position and of the orientation of a hand-held measuring appliance even in highly transected terrain or in interior rooms.

A further object is to shorten the periods between the necessary measurements.

A further object is the provision of a local positioning and orientation system in which the electronics required for determining the spatial position can constantly be carried along with the unit whose position is to be determined and which, in its design, is therefore substantially independent of the number of users.

The increase in the accuracy of determination of actual position and actual orientation is a further object of the present invention.

A further object is the simplification and shortening of the measurements for determining actual position and actual orientation.

A further object of the invention is to permit automatic identification and surveying of the reference points.

A further object of the invention is to permit automatic determination and checking of processing points between defined start and end points.

A further object of the present invention is to provide a method, a hand-held measuring appliance or a positioning and orientation system which permits a continuous correction of the measurements of positioning and orientation systems based on other principles of operation, said correction preferably taking place in the background.

These objects are achieved, according to the invention, by features of claims 1, 14, 15, 27 and 29, respectively, or by features of the subclaims.

The invention relates to a method and a positioning device or system for determining the actual position, in particular in association with the use of a geodetic instrument.

For this purpose, a number of reference points is established, made detectable and surveyed in a first step of the method. This quantity of reference points is chosen so that as far as possible at least two of the reference points can be detected from each point of the region to be used. Surveying of the positions of these reference points can be effected using generally known methods of surveying technology, for example by means of a total positioning system or a global positioning system or by aerial photogrammetry. If the reference points are present in closed rooms, they can also be surveyed, for example, using hand-held telemeters, either the distance to the same reference point being recorded from a plurality of known positions or it being possible to use further information, such as, for example, from angle measurements. In principle an already measured trigonometrical point can also be chosen as a reference point. The reference points can, however, also be surveyed with the positioning device according to the invention relative to a specified starting point on which the positioning device is initially placed.

In order to make the reference points detectable, they are defined by mounting specially designed elements. Cooperative targets, such as, for example, triple prisms, reflective foils or other reflectors customary in surveying technology can be used for this purpose. The use of spherical elements provides a combination of accurate determination of a reference point with good detectability from different directions. Said elements may be, for example, in the form of reflective spheres or in the form of hemispheres or quarter-spheres. Because of the form and the reflectivity of the surface, incident laser radiation is reflected back equally for all directions of incidence. Owing to the fixed radius, the distance to the defined point can be accurately calculated. Moreover, owing to the centre of gravity of the reflection on the surface of the sphere or of the sphere segment, the position of the reference point can also be determined for angle measurements with sufficient accuracy.

Particularly in association with a relatively long-term use of an area, for example a large building site, it is possible, by setting up a large number of reference points, to define a network of known positions which can be seen from most areas and which represent the basis of this local positioning system and, owing to the advantages of a relatively long duration of use, can also be measured with greater effort.

The positioning device according to the invention has at least one radiation source for emission of laser radiation. After emission and subsequent reflection at a surface, this laser radiation is once again detected and evaluated in a receiver, a distance measurement based on the phase measuring principle or the principle of pulse transit time measurement being carried out. Such an apparatus is disclosed, for example, in EP 0 738 899 B1. A further principle for distance measurement which can be used according to the invention is described in WO 2004/074773.

The laser beam is guided over at least one spatial segment in a scanning movement, it being necessary for spatial segment, number of reference points and orientation of the detected spatial segment to be tailored to one another in such a way that, for the purpose of a distance measurement, at least two of the reference points are located in one spatial segment or in each case one reference point is located in one of two spatial segments. Depending on the specifically chosen realisation of an embodiment, different scanning movements can be chosen for the spatial segment. Thus, for example in the case of the use of counterrotating prisms as a control element of a scanner, rosette-like scanning of a circular scanned or detected spatial segment is possible.

The reference points can in principle be detected if the spatial segment passes over a region and reference points entering the spatial segment or present therein are detected, identified and surveyed. In addition, with the use of components for independent scanning of a plurality of spatial segments, it is also always possible to track one or more reference points. This means that the spatial segment is always aligned with the reference point so that continuous identification of reference points can be dispensed with or limited to a verification.

The reference points can be distinguished from the background on the basis of their reflectivity, so that the position thereof can be determined simply from the variation in the intensity of the reflected radiation. By linking emission direction and intensity maximum, it is possible to derive both distance and the direction to the reference point as position information.

Advantageously, however, image recording and image processing methods can also be used. In this case, linked with the distances, images are additionally recorded by the positioning device. These may consist of complete images of a visual area detected or, for example, of partial images or sections in which the reference points are localised, and the position information is derived from the position in the image. With CCD and CMOS cameras a large number of suitable sensors which can also be supplemented by suitable optical components and can be integrated in the form of a wide-angle endoscope also in miniaturised form in devices is available for recording of images. The measured distances are coordinated with the position information which consists, for example, of angles which can be derived on the basis of the number of pixels present between two identified reference points.

From the distances or the distances associated with the respective angles, it is now possible to obtain the actual spatial position and, with a knowledge of the emission axis of the radiation relative to a reference axis of the measuring appliance, also the orientation. For deriving this information, generally known methods of photogrammetry and of image processing can be used. The association of image and distance information has a large number of advantages over the sequential surveying of individual points. Because of the detection simultaneously or within a short time and arrangement of the image measurements in the form of images, coordination problems are avoided. Moreover, the detection of the spatial arrangement or sequence of the measurements provides additional information which can be used for the subsequent determination of the actual position or actual orientation.

In comparison with known methods which determine a position in the plane, mathematically more complex descriptions arise in the case of three-dimensional problems.

In two dimensions, a rotational position is described by a single angle, and the corresponding rotation group SO(2) is commutative and isomorphous with the unit circle $S^1$ (with complex multiplication as a group operation).

In three dimensions, on the other hand, rotational position is described by a point in the three-dimensional Lie group SO(3) which is non-commutative and has, as 3-dimensional manifold, a substantially more complicated topology, in particular is not homeomorphic with the 3-dimensional unit sphere $S^3$.

The identification of the reference points and hence the linkage of the position information recorded by the positioning device with the position of a specific reference point can be effected in various ways. Firstly, the elements defining a reference point can be made distinguishable so that a detected reference point can be uniquely identified without further reference to other reference points. For this purpose, it is possible to attach a code which, for example, like a barcode, can be detected and evaluated in the recorded image, or to specially design the physical properties of an element. An example of such a design of the physical properties is the superposition of a diffractive structure on a reflective sphere. However, this can also be uniquely designed in its spectral reflectivity. If an element designed in such a manner is detected by a laser beam with two wavelengths, identification of the element can be effected on the basis of the typical intensity relationship of the reflection.

In addition, however, it is precisely image processing methods that offer the possibility of using elements without designing them individually, by also taking into account the arrangement of the elements relative to one another. Since the spatial position of all reference points is known, the position of the reference points relative to one another, which is derived from a detected image, can be used for permitting identification of the individual points. For this purpose, it is advantageous if a coordination with positions can be effected unambiguously from only a few reference points and their position relative to one another. For ensuring good identifiability, even in the case of only small detected partial quantities, the reference points can be stochastically distributed or be placed in the form of special arrangements, such as, for example, a mathematical M-sequence.

If further components for position determination are used in the measuring appliance, such as, for example, inertial sensors which register a change relative to a known start position, this information too can be used, optionally together with a direction or inclination measurement, for identification of the reference points detected in the spatial segment.

If only a small number of reference points is used or if it is possible or expedient to establish or mount them only in a limited region, a coarse search for automatic detection of reference points can be used, which search proposes an alignment of the measuring appliance to the user or aligns a component of the measuring appliance which is suitable for the detection of the spatial segment, so that no interaction with the user is required.

In order to be able to carry out an alignment or orientation determination in addition to the location or position determination of the measuring appliance, a link must be made between the measurement of the reference points and distinguished axes of the appliance. In this respect, directions to the reference points in the form of vectorial quantities are also required in addition to the measured distances. Said vectorial quantities can be derived, for example, from the inclination measurements used for the position determination.

Alternatively or in addition, however, the position of the components of a scanner system can also be measured so that, in the detection and surveying of a reference point, the direction of the measuring beam relative to the axis of the appliance is also known. The quantities required for this purpose can be reduced to a single parameter. If, for example, the scanning movement is known, it can be configured as a function of time so that the emission or receiving direction then current can be concluded from the time of a measurement. The determination of the spatial position as a position and orientation measurement therefore in principle requires only the measurement of a further, appliance-internal quantity.

A measuring appliance according to the invention will generally have further measuring functionalities which permit a use as a geodetic instrument or are integrated in such an appliance. For example, such a hand-held measuring appliance can be designed so as to be capable of being used for surveying in the construction sector, by integrating a further laser telemeter or providing the distance measuring functionality which is in any case already present according to the invention for further measurements. By means of such an embodiment, it is possible to measure distances in buildings without having to effect a separate position determination and position storage in the case of each measurement. The measured direction-related distances are automatically coordinated as vectorial quantities with the position assumed in the measurement and are stored or transmitted. In addition, further measurements can also be carried out simultaneously.

Such an embodiment can also be used for carrying out the initial establishment and surveying of the reference points. For this purpose, reference points are established at positions which can be seen at least from partial areas of the region to be used or surveyed and can be made detectable by suitable elements. Below, the positions of the reference points are surveyed from a known initial position by recording angle and distance. If no angle measuring functionality is available, a pure distance measurement from a plurality of known initial positions can also be used instead for deriving the positions of the reference points.

A further use according to the invention consists in the combination with a positioning and/orientation measuring system operating in a different manner. This further system may now have a supporting function or may itself be supported. Thus, inertial sensors which measure, for example, types of rotation and linear accelerations frequently have drifts which lead to the deviation of the measured actual position from the true position. A positioning system according to the invention offers a suitable correction functionality which corrects deviations at certain time intervals by actual position determinations according to the invention. On the other hand, the periods between the steps carried out according to the invention can be supported by position determination by means of inertial sensors. Furthermore, temporary loss of the detection of reference points can be bridged by a further positioning system so that either the number of reference points can be reduced and/or the region accessible to measurements can be briefly extended. Such a positioning device designed in hybrid form can thus also compensate for the brief loss of a visual link to reference points, so that the region of use is generally increased in size and the device can be made more robust with regard to its use. The same considerations apply in an analogous manner to orientation measuring systems.

On the basis of the dimensions of geodetic instruments as well as the components thereof and a small beam cross-section, highly accurate and stable positioning is a critical requirement. Advantageously, all components of the radiation source, beam guidance and the controlling and evaluating components can therefore be mounted on a common base plate or realised on a common substrate. An optical structural element or structural part which is particularly suitable with regard to the mounting requirements and the necessary accuracy of mounting and is in the form of components, and a total system, are described in DE 195 33 426 A1 and EP 1 127 287 B1. WO 99/26754 and European Patent Application no. 02026648 not yet published on the date of filing describe suitable methods for fixing miniaturized structural parts by means of solder on a base plate. A suitable method for fixing a miniaturised structural part on a support plate, in particular for fine adjustment of optical components, is described, for example, in European Patent Application no. 02026650 not yet published on the date of filing.

In this context, the term "positioning device", "orientation measuring device" or "hand-held measuring appliance" is always to be understood as meaning generally a measuring instrument or an instrument which is used in association with geodetic measurements or machine guidance, such as, for example, a plumbing staff or a location or direction determination of a construction machine. In general, the invention relates to methods and apparatuses for position and/or orientation determination for measurement or checking of data having a spatial reference. In particular, a geodetic instrument is to be understood here as meaning hand-held telemeters and theodolites and also so-called total stations as tacheometers with electronic angle measurement and electrooptical telemeters. Equally, the invention is suitable for use in specialised apparatuses having a similar functionality, for example in military aiming circles or in the monitoring of industrial structures or processes or machine positioning or guidance.

The method according to the invention and a hand-held measuring appliance according to the invention or a local positioning and orientation system according to the invention are described in more detail below purely by way of example with reference to working examples shown schematically in the drawing. Specifically FIG. 1 shows the diagram of a possible embodiment of the first step of the method according to the invention for positioning a construction machine;

Figure 6A:
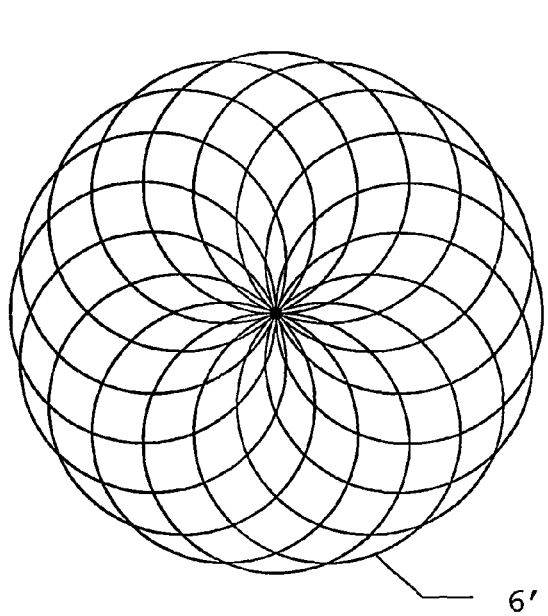
Figure 6B:
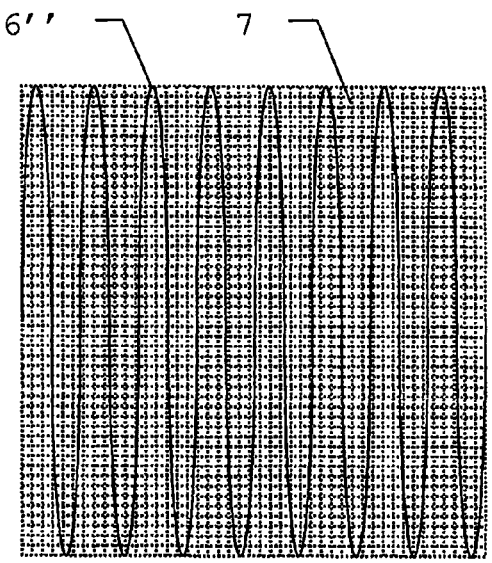
Figure 7A:
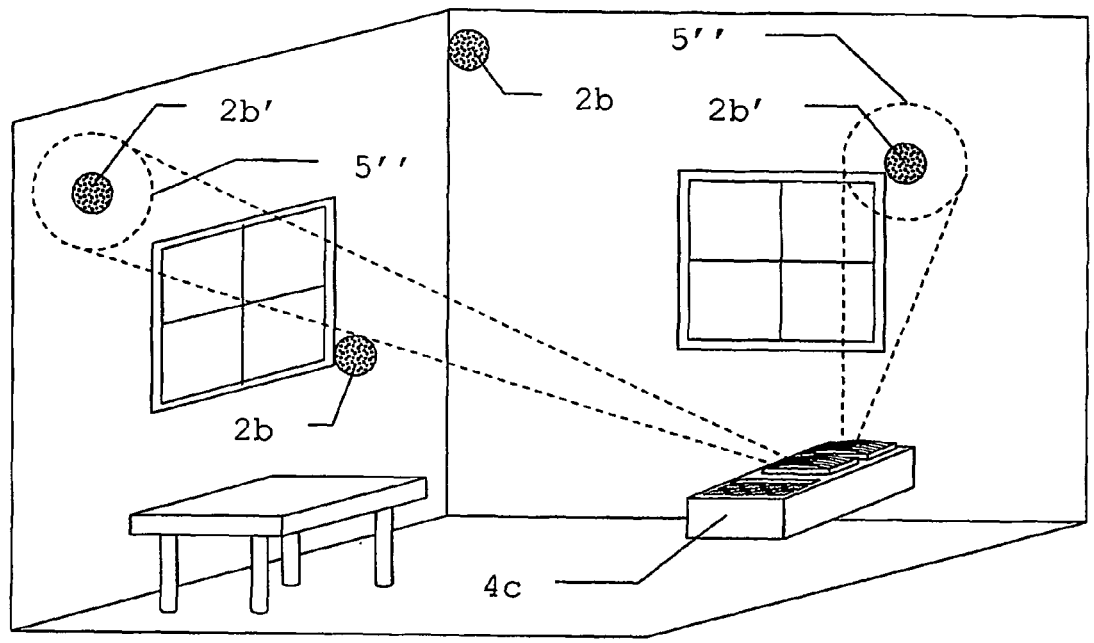
Figure 7B:
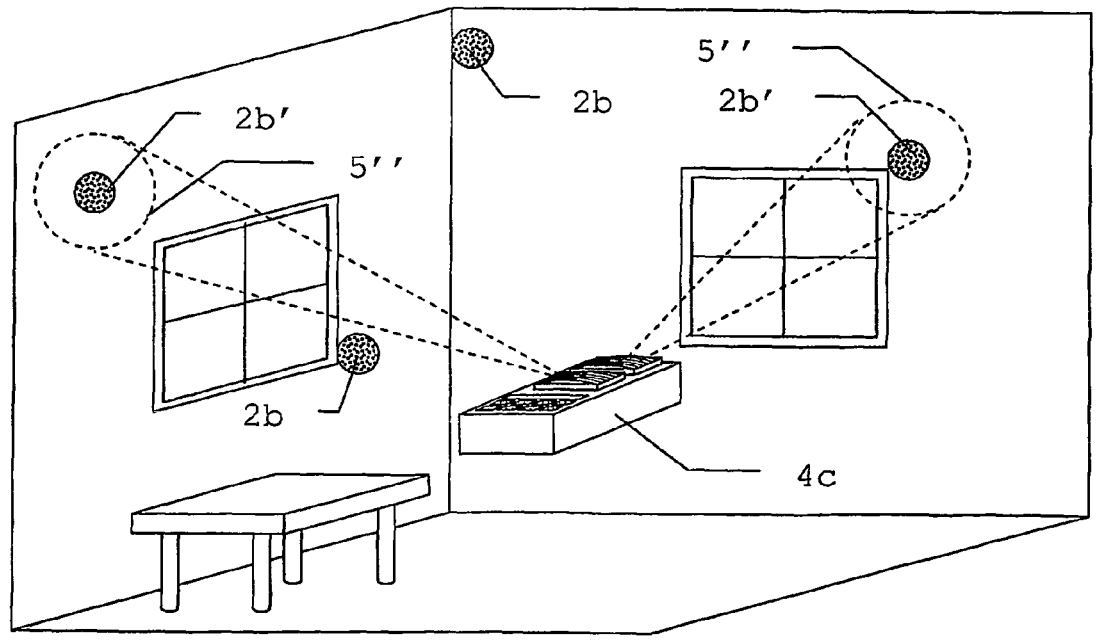
Figure 8:
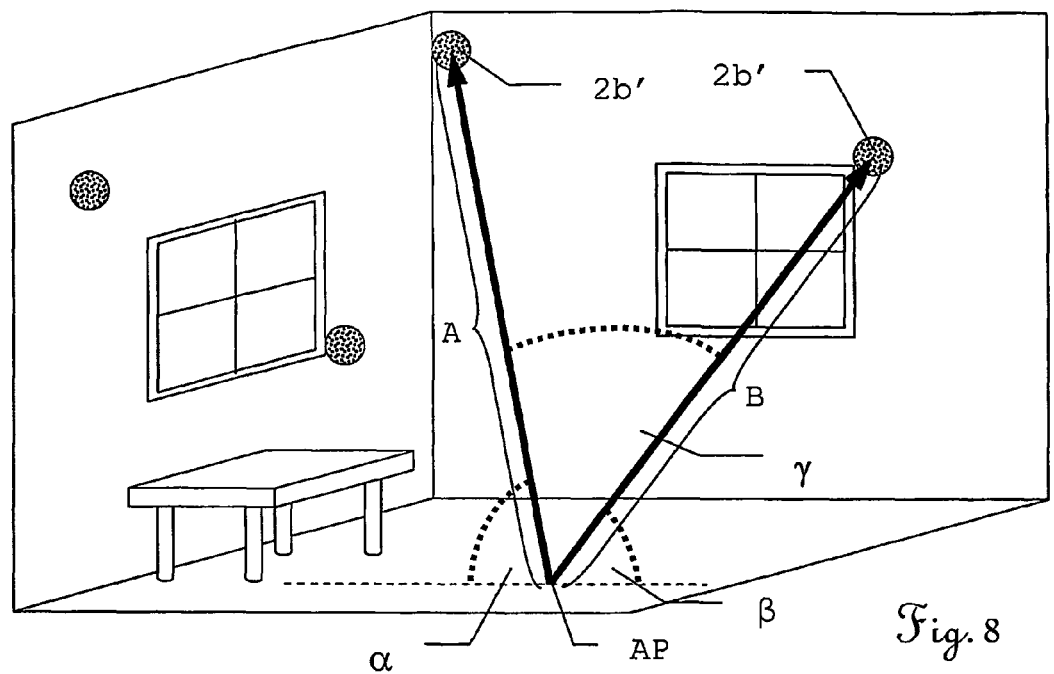
Figure 9:
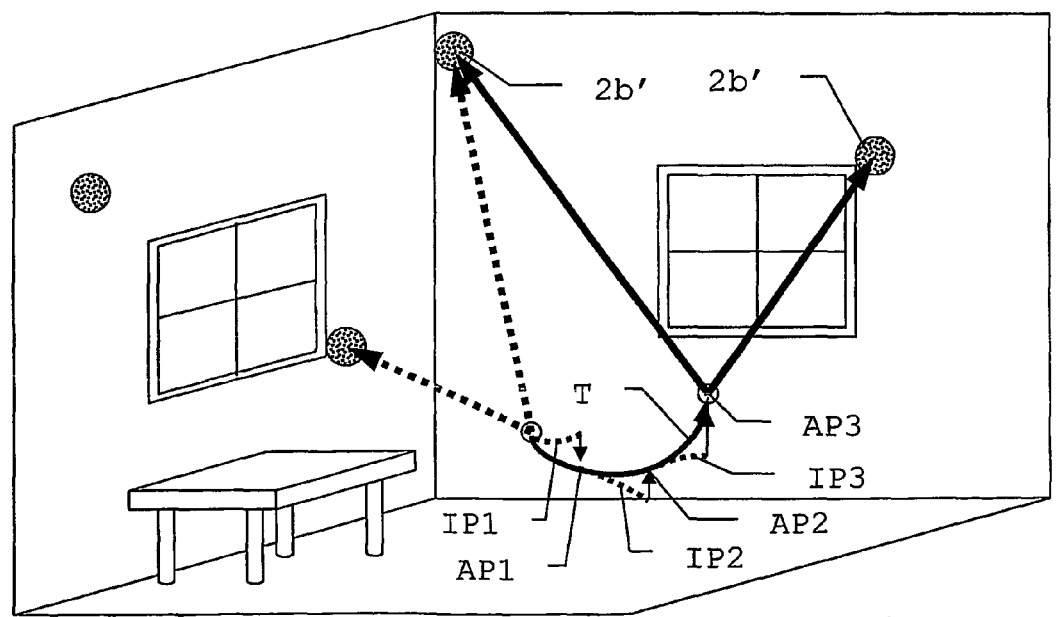
Figures 10A, 10B:
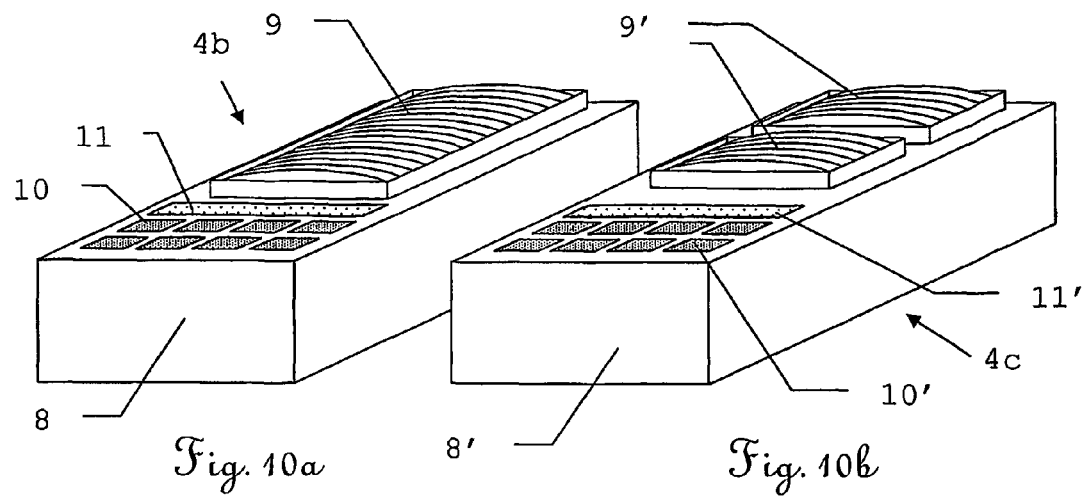
Figure 11:
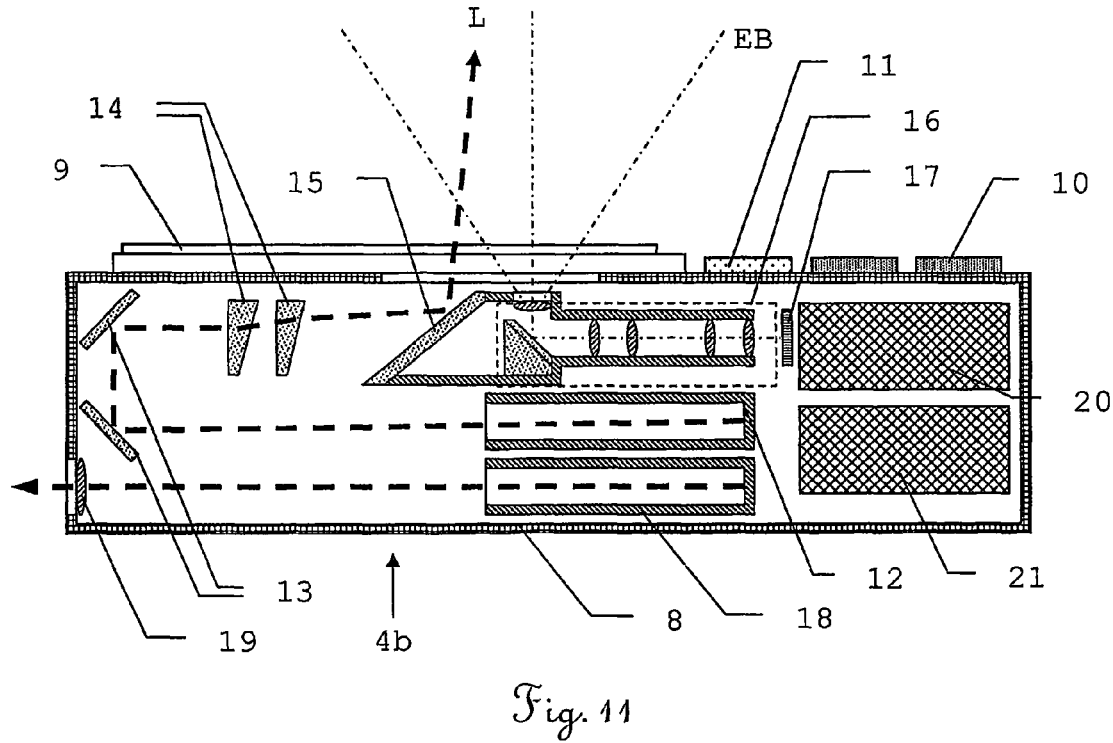
Figure 12:
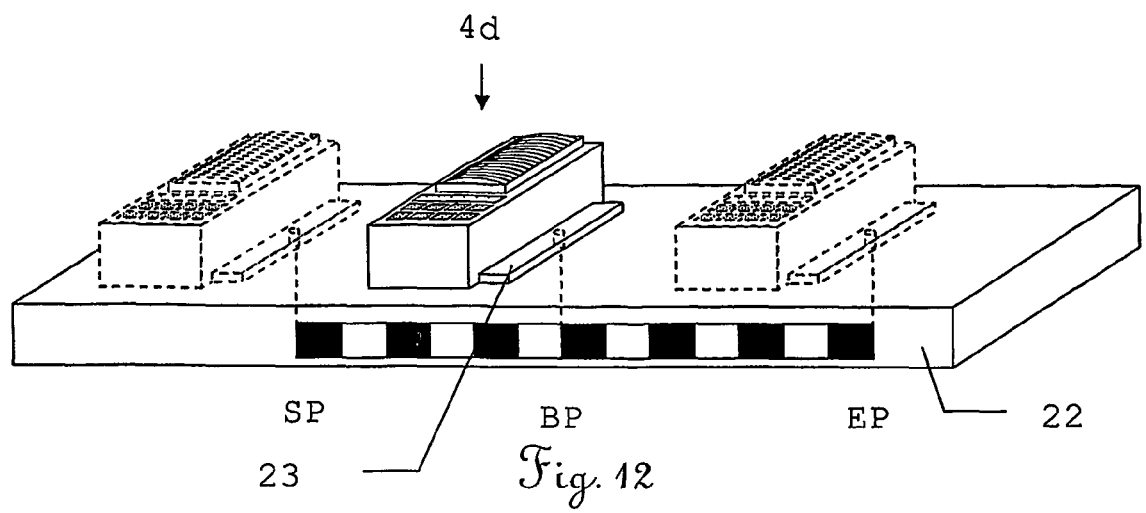
Figure 13:
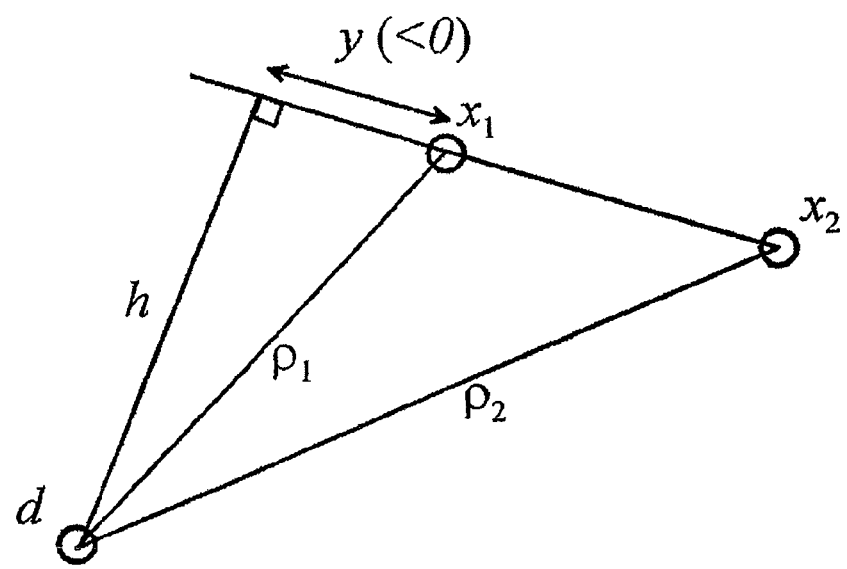

FIG. 6a-b show the diagram of suitable scanning movements for a method according to the invention;

FIG. 7a-b show the diagram of a further possible embodiment of the second and third steps of the method according to the invention for position determination in an interior room of a building with detection of two spatial segments independently of one another;

FIG. 8 shows the diagram of the mathematical conditions for deriving the actual position and actual orientation of the moveable measuring appliance from the position information and the positions of the first and second reference points;

FIG. 9 shows the diagram of the use of a method according to the invention in combination with a further positioning or orientation measuring device;

FIG. 10a-b show the diagram of a first and second possible embodiment of a measuring appliance according to the invention;

FIG. 11 shows the diagram of components of the first embodiment of a measuring appliance according to the invention;

FIG. 12 shows the diagram of the use, according to the invention, of a method according to the invention with a third embodiment of a measuring appliance according to the invention for establishing processing positions, and FIG. 13 shows the diagram of fundamental mathematical relationships for deriving the spatial position of the moveable measuring appliance.

Figure 1:
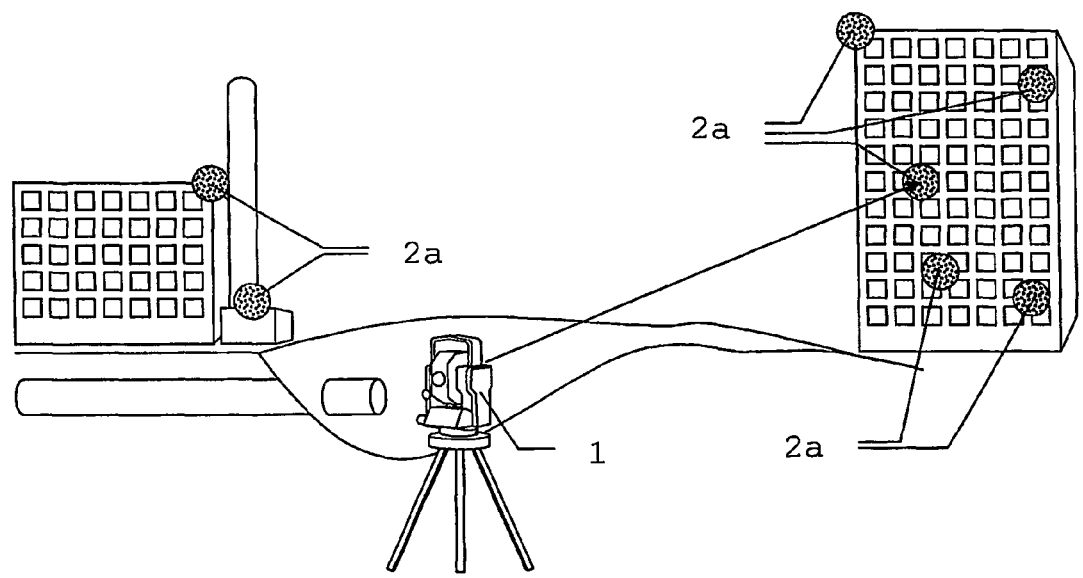

FIG. 1 shows, by way of example, the first step of a method according to the invention for positioning a construction machine. By means of a total station 1 as a geodetic surveying instrument, reference points 2a mounted on adjacent buildings on a building site are surveyed and their spatial position is determined. This establishment of the reference points 2a at elevated positions permits good viewability and detectability from large parts of the building site. The location of the total station 1 is known as the initial position of the method. In principle, the position determination of the reference points 2a can, however, also be effected using other apparatuses or methods. In particular, the position determination of the reference points can also be effected according to the invention by means of a positioning device according to the invention which is present at a known initial position. If points whose position is in any case known exist, these can also be made detectable as reference points and used in the method according to the invention.

Figure 2:
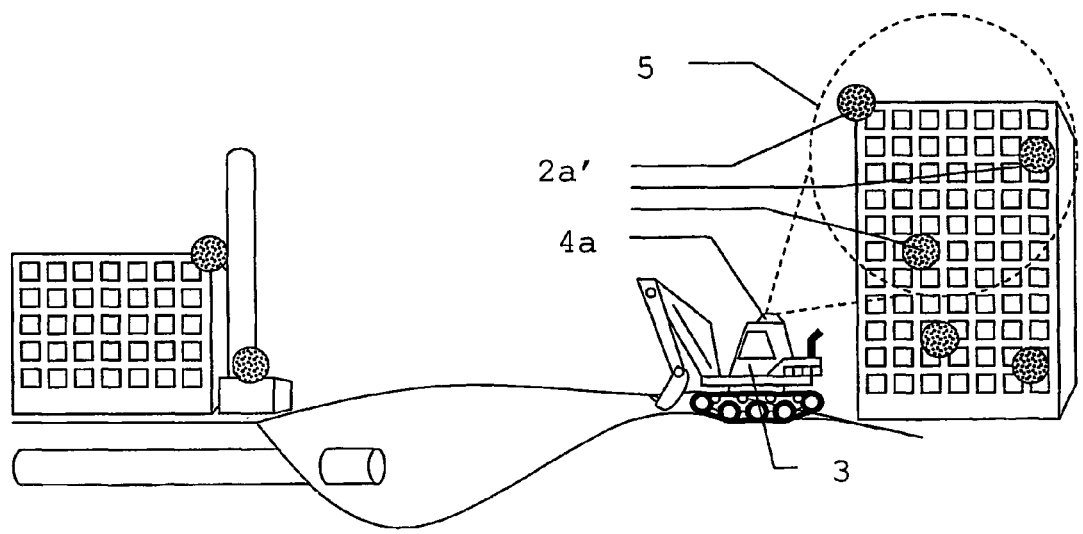
FIG. 2 shows the diagram of a possible embodiment of the second and third steps of the method according to the invention for positioning a construction machine.

FIG. 2 shows, by way of example and purely schematically, the second and third steps of a method according to the invention for positioning the construction machine 3. A positioning device 4a which detects a spatial segment 5 in which, in the general case of an angle and distance measurement, at least two reference points 2a' should be present is mounted on the construction machine 3. If this spatial segment 5 comprises less than two reference points 2a', it may be necessary to change the size or orientation of the detected spatial segment 5. For a local positioning system based purely on distance measurements, however, at least three reference points 2a' present in the spatial segment 5 must be detected and their distance to the positioning device 4a must be measured. The actual position is derived from the measured values.

Figure 3:
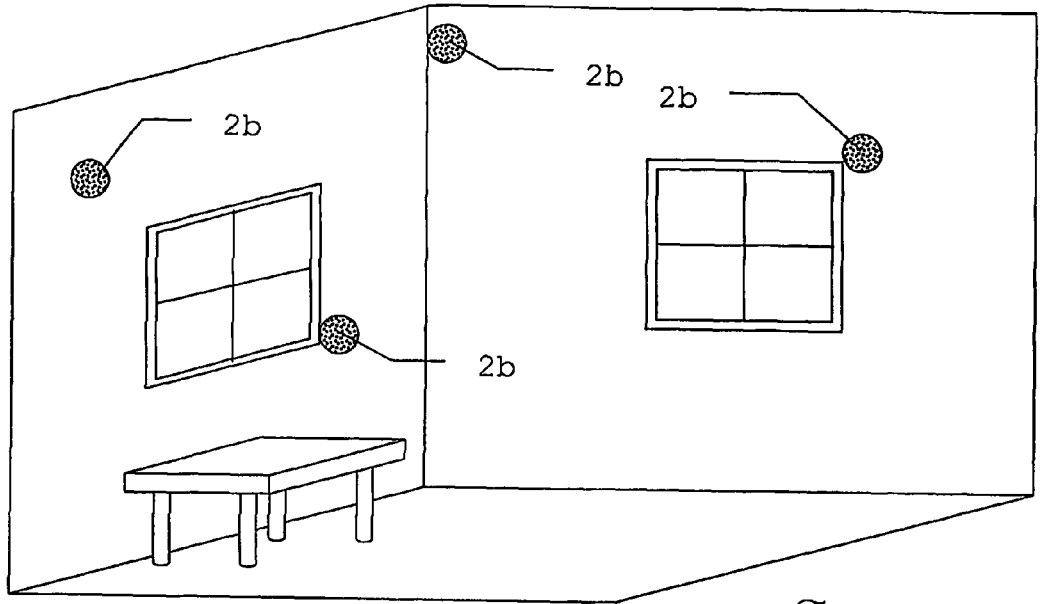
FIG. 3 shows the initial situation for using the method according to the invention in an interior room of a building.

The initial situation for another field of use of the method according to the invention is shown in FIG. 3 by way of example for a use in an interior room of a building. Reference points 2b are mounted on the walls of the room before the beginning of a surveying job and are surveyed with respect to their position. This can be effected, for example, using a hand-held telemeter as a measuring appliance with inclinometer and direction meter. By means of this telemeter, the positions of the reference points 2b are derived in succession from a known initial position by measurement of angle of inclination, direction and distance.

Figure 4:
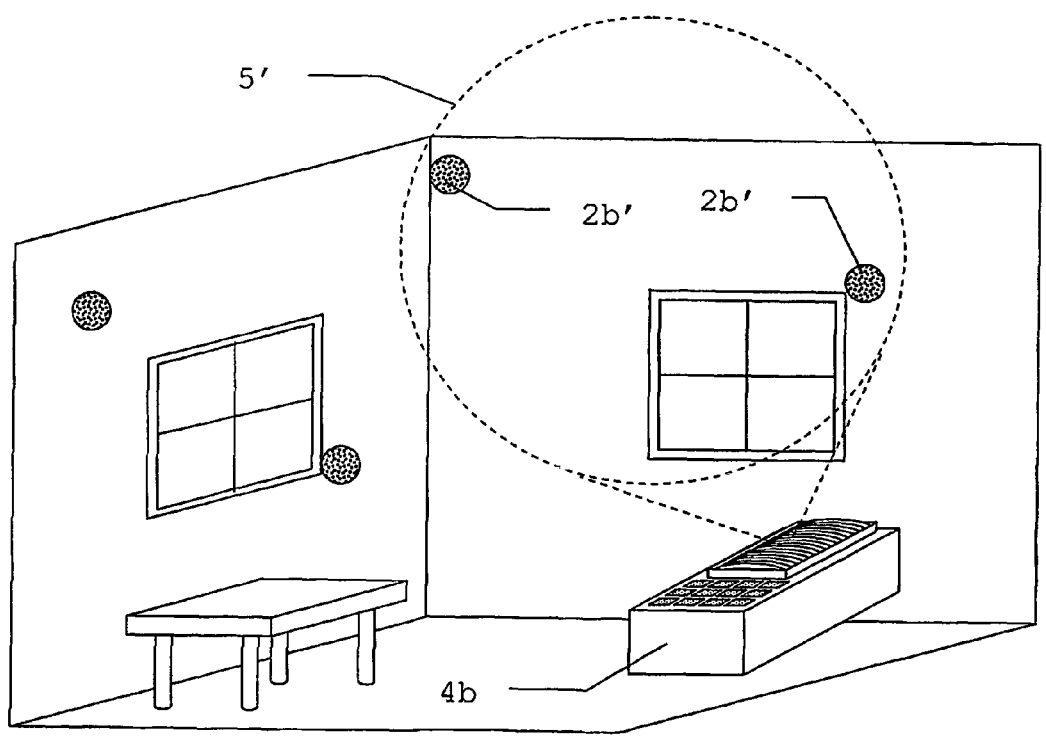
FIG. 4 shows the diagram of a possible embodiment of the second and third steps of the method according to the invention for position determination in an interior room of a building with detection of only one spatial segment.

FIG. 4 shows the diagram of the subsequent steps of the method according to the invention for position determination in an interior room of a building. A measuring appliance 4b according to the invention detects a spatial segment 5' in which at least two reference points 2b' are detected. The two reference points 2b' detected and scanned in the spatial segment 5' are surveyed with respect to their distances and angles of inclination by the measuring appliance 4b. However, alternative amounts of variables can also be used for determining the actual position and/or actual orientation, such as, for example, the approach which is shown in FIG. 2 and based purely on distance measurements but for which at least three reference points would have to be surveyed with respect to their distance. The actual position of the positioning device 4b can be concluded from the distances and angles of inclination as location information, taking into account the absolute positions of the reference points 2b'. As is also the case below, the diagram is purely schematic so that the size relationships of the objects shown are not to be regarded as being to scale.

Figure 5:
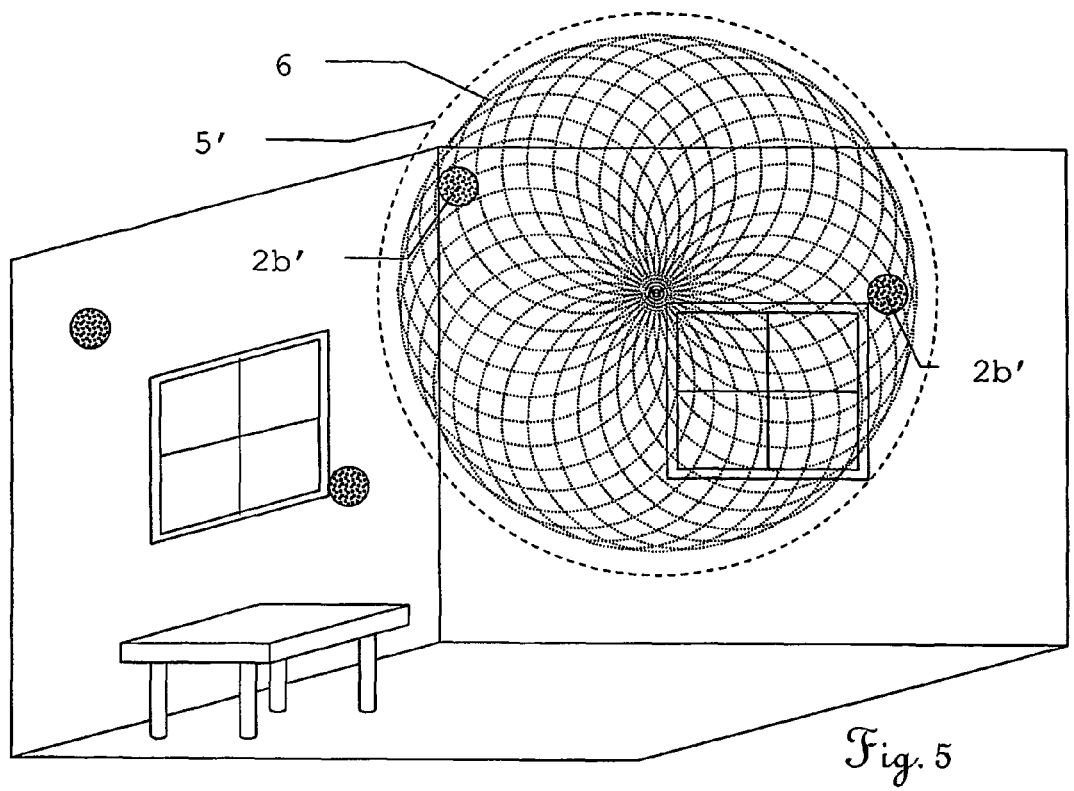
FIG. 5 shows the diagram of an example of the scanning movement in the automatic detection and derivation of position information for a first and a second reference point.

FIG. 5 shows the diagram of an exemplary scanning movement in the automatic detection and derivation of location information. The spatial segment 5' is detected as substantially as possible by means of a laser beam in a scanning movement 6. For scanning relatively large spatial segments, as a rule a movement about two axes is effected. In this example, the laser beam is guided with a conical detection region in a rosette-like scanning movement 6 over the spatial segment 5' with circular cross-section, the position of the device components used for the scanning movement 6 being detected. When the laser beam strikes one of the reference points 2b' present in the spatial segment 5', a reflection of high intensity is generated and is used for detecting the reference point 2b', for example by using a filter or detection of reflections which is dependent on a threshold value. By means of the laser beam, a measurement of the distance to the reference point 2b' is effected simultaneously. If the scanning movement 6 takes place rapidly compared with a movement of the spatial segment 5' the position of the reference points 2b' relative to one another can be concluded from the position of the received reflections as a function of time, since the parameters of the scanning movement 6 and its course as a function of time are known.

FIG. 6a-b show the diagram of suitable scanning movements for a method according to the invention. FIG. 6a shows a further rosette-like scanning movement 6' with lower degree of coverage of a completely detected circular spatial segment. However, other forms of scanning movement 6" can also be used according to the invention. For example, a rectangular spatial segment which corresponds, for example, to a matrix of pixels 7 can be filled by a zig zag scanning movement 6". If the scanning movement is known, it can also be configured, for example with the time or a position of the shaft of a common drive motor which drives all part movements of the scanning process together as a parameter.

FIG. 7a-b show an exemplary use of two spatial segments 5" in the automatic detection and derivation of location information.

In a second embodiment, the measuring appliance 4c has two trackers which are each formed for tracking reference points 2b. Each of the two trackers searches, independently of the other, for a spatial segment 5" in which a detectable reference point 2b' is present. After the detection of the reference point 2b', the latter is continuously tracked and the spatial segment 5" thus remains continuously aligned with the respective coordinated reference point 2b'. In spite of the different positions of the measuring appliance 4c which are shown in FIG. 7a and FIG. 7b, the detection of the same reference points 2b' is always effected so that a change and a fresh identification of reference points are not necessary.

FIG. 8 illustrates the mathematical conditions for a possibility for deriving the actual position AP of the moveable measuring appliance from the location information and the positions of the first and second reference points 2b'. From the positioning device present at the actual position AP, the first distance A together with the associated angle $\alpha$ of inclination and the second distance B together with the associated angle $\beta$ of inclination to both reference points 2b' are measured. From a knowledge of these quantities, the actual position AP can be unambiguously derived—apart from reflection at a vertical plane through the two reference points 2b'. Alternatively, instead of the measurement of the second distance B, it is also possible to measure the angle $\gamma$ between the two reference points or to derive said angle from a recorded image. From these quantities, too the actual position can be unambiguously derived—likewise apart from the reflection. If moreover the angle relative to an axis of the appliance is known, the orientation of the measuring appliance can also be determined.

FIG. 9 schematically shows the use of a method according to the invention in combination with a further positioning or orientation measuring device. Starting from a first position from which a measurement to reference points has taken place, the measuring appliance is moved along a trajectory T, the measuring appliance being equipped with inertial sensors as a further positioning or orientation measuring device, which sensors continuously carry out a position or alignment determination. Owing to drift effects, an apparent position or alignment along the first interpolation path IP1 is indicated thereby, the development of which is corrected again after a time interval by a determination of a first actual position AP1 or of an actual orientation by means of the method according to the invention. During passage through the trajectory, the development of the apparent positions along the second interpolation path IP2 and the third interpolation path IP3 are corrected at time intervals in succession by the second actual position AP2 and third actual position AP3 measured by the method according to the invention or the actual orientations. By the combination of the two methods, either positions present between the measurements of the method according to the invention can be derived, regions not provided with reference points can be overcome or a correction of the device based on inertial sensors can be effected. In addition, an extension of the field of use and facilitation of the handling are realised by such a combination.

FIG. 10a-b graphically show two possible embodiments of the measuring appliance according to the invention.

The measuring appliance 4b shown in FIG. 10a as a first embodiment has a housing 8 on the top of which keys 10 for inputting data and control commands are mounted. In a display field 11, results of measurements are displayed. The emission of laser radiation and the detection of the spatial segment are effected through a hood 9 which is present on the measuring appliance 4b and is transparent to radiation. Because of the curvature of the hood 9, solid angle regions located to the sides of the measuring appliance 4b can also be detected.

FIG. 10b shows a second embodiment of the measuring appliance 4c. In addition to housing 8, keys 10 for inputting data and control commands and a display field 11, the measuring appliance 4c has two hoods 9' which are transparent to radiation and through which the emission of laser radiation and the detection of a spatial segment in each case take place. The emission and detection are controlled by trackers which permit automated target tracking of reference points.

FIG. 11 shows the diagram of components of the first embodiment of a measuring appliance 4b according to the invention, comprising a housing 8 and the components integrated therein. Keys 10 and a display field 11 for inputting and outputting data and control instructions are present on the housing 8. Laser radiation L which is guided by means of deflection elements 13 onto a rotatable pair 14 of prisms as a control component is emitted by a first radiation source 12. By means of the rotatable pair 14 of prisms, the angle at which the laser radiation L strikes a mirror 15 is periodically varied so that a rosette-like scanning movement of the laser beam L emitted by the measuring appliance 4b through the hood 9 results. The position of the components used for the emission can be continuously detected for deriving the actual orientation. The laser radiation reflected back by a target, in particular a reference point, is fed back via the same beam path to the radiation source 12, in which in this case a receiver for distance measurement is structurally integrated.

The radiation reflected back by a reference point present within the detection region EB is moreover guided via an optical system in the form of endoscope 16 to a camera 17 as an image-recording component. By means of the camera 17, detection of the reference points and identification thereof by image processing methods are permitted simultaneously with the distance measurement. In particular, an angle measurement can be carried out here by counting the pixels present between two reference points.

For control and data processing, the measuring appliance 4b according to the invention has a computing unit 20 comprising a measuring component for automatic detection of reference points which have been made detectable and for derivation of location information of the reference points and of a position component for deriving the actual position and actual orientation of the measuring appliance 4b from the location information of the reference points.

Optionally, the measuring appliance may also have inertial sensors 21.

In order to provide simultaneous functionality as a geodetic instrument, the measuring appliance 4b may have a second radiation source 18 which is likewise in the form of a telemeter and by means of which distance measurements to targets to be recorded are possible. By combining measuring appliance 4b and a conventional telemeter, it is possible to establish an automatic link between distance information and actual position or actual orientation and thus to simplify and accelerate the entire surveying process.

Of course, these figures which are shown are only examples of possible embodiments of apparatuses and methods. Thus, the components used in FIG. 10 could also be used according to the invention in other configurations and sequences. In addition, it is within the ability of the person skilled in the art to use additional or alternative optical components, for example having a diffractive effect, and components which have the same or a similar effect or functionality and are generally used in laser physics or laser technology. In FIG. 10, necessary electronic control, position measuring and supply parts and mounting components are not shown merely for reasons of clarity.

FIG. 12 explains the use, according to the invention, of the method according to the invention for establishing processing positions BP. With a third embodiment of the measuring appliance 4d according to the invention as a positioning device, in each case a start position SP and an end position EP are established on a workpiece to be processed, which is represented here by way of example by a block board 22. Examples of the processing of workpieces are the hammering of nails into walls or the drilling of holes. By means of a strip 23 mounted to the side of the measuring appliance 4d and having a marking opening, the processing positions BP reached can be marked on the block board 22. Thus, a departure of marking opening and reference point of the position determination from one another in the measuring appliance 4d can be taken into account by calculation. The distance defined by start position SP and end position EP is divided into predetermined sections by a computing component in the measuring appliance 4d. These sections may be both equidistant and determined according to a more complex pattern. The measuring appliance 4d is subsequently guided over the blackboard 22, a display indicating in each case the reaching of one of the predetermined processing positions BP. This can then be marked for further processing steps. For such an application, the measuring appliance 4d can be equipped with rollers or sliding segments, similarly to a computer mouse.

FIG. 13 illustrates fundamental mathematical relationships for deriving the spatial position of the moveable measuring appliance.

For measurement of the position in a position determination, in principle three minimum variants are possible with regard to the choice of measured values to be recorded.

1. Measurement of the distances to two reference points and measurement of the elevation of one of the reference points.

2. Measurement of distance and elevation to one of the two reference points and measurement of the angle between the two reference points.

In both cases, the two reference points are not permitted to be vertically one above the other and in both cases there are in a favourable case two solutions for the position, namely symmetrical to the plane which contains the two reference points and is perpendicular to the horizontal plane.

This ambiguity can be eliminated in practice in various ways, for example by means of a direction meter, for example a compass, there being no need to set any high accuracy requirements for said compass, or by means of a priori knowledge of the setup. Thus, for example, the reference points are on a wall and the object cannot measure through the wall or, at the start, it is known on which side of the symmetry plane the object is present and it is then tracked and can thus also pass through the symmetry plane.

The points with constant distance and elevation to a reference point thus lie on a circle of latitude of the sphere with the reference point as centre and the distance as radius.

3. Measurement of the elevations of both reference points and measurement of the distance to one of the reference points.

Here too the two reference points are not permitted to be vertically one on top of the other and in addition the reference point to which the distance is measured is not permitted to lie at the same (vertical) height as the object, since otherwise the elevation of the reference point to which the distance was not measured is zero for all points of the circle of latitude. In a favourable case, there are once again two symmetrical solutions for the position.

In order to obtain an accuracy sufficient for geodetic applications, it may be advantageous to measure distance and elevation to both reference points. There is a higher accuracy for this approach, owing to the redundancy. A measurement of distance and elevation to one of the two reference points and measurement of the angle between the two reference points does however have greater hardware complexity owing to the necessary measurement of the intermediate angle.

Below, it is explained how a three-dimensional position d can be derived in the minimum case of a determination of only two distances $\rho_1$, $\rho_2$ to two reference points (position vectors $x_1$, $x_2$) and the elevation $\alpha_1$ to the first reference point. A triangle defined by the vectors d, $x_1$, $x_2$ serves as a starting point for the consideration of the general three-dimensional case of a position determination, FIG. 13 showing the figure lying in the plane of this triangle.

The height $h>0$ of the triangle and the signed height section y are calculated using planar geometry according to $$y = \frac{\rho_1^2 - \rho_2^2 + \|x_2 - x_1\|^2}{2\|x_2 - x_1\|^2}, h = \sqrt{\rho_1^2 - y^2} \quad (1)$$

In FIG. 13, y is <0; in a case in which the height is within the triangle, y is >0.

All positions d which are still suitable after use of the measured distances now lie on the circle in the plane perpendicular to $x_2-x_1$, with the centre being the base of the vertical and radius h. In order to describe this circle analytically in a simple manner, the following orthonormal trihedron adapted to the situation is introduced:

$$\bar{e}_1 = \frac{x_2 - x_1}{\|x_2 - x_1\|}, \bar{e}_2 = \frac{e_3 \times \bar{e}_1}{\|e_3 \times \bar{e}_1\|}, \bar{e}_3 = \bar{e}_1 \times \bar{e}_2 \quad (2)$$

Here, x designates the vector product and $e_3$ is the vertical base vector of the geodetic coordinate system. The vector $\bar{e}_2$ is therefore horizontal. The position vectors d on said circle which are still suitable can therefore be described as follows:

$$d = x_1 + y \cdot \bar{e}_1 + h \cdot (\bar{e}_2 \cos \phi + \bar{e}_3 \sin \phi) \quad (3)$$

the angle $\Phi$ being a still unknown parameter. It must be determined by the measured elevation $\alpha_1$. The following is true $$\rho_1 \sin \alpha_1 = e_3^T(x_1-d) = x_1^3 - d^3 \quad (4)$$

the third component of the vectors being written with the superscript 3. Together with equation (3), the following condition arises $$\rho_1 \sin \alpha_1 = -y \cdot \bar{e}_1^3 - h \cdot (\bar{e}_2^3 \cos \phi + \bar{e}_3^3 \sin \phi) \quad (5)$$

which generally permits two solutions for $\Phi$. The solutions to equation (5) can, for example, be determined numerically. If they are substituted into (3), the two possible positions follow. Equation (5) can also be solved explicitly: it has the form $$A \cos \phi + B \sin \phi + C = 0 \quad (6)$$

where $$A = h \cdot \bar{e}_2^3, B = h \cdot \bar{e}_3^3, C = y \cdot e_1^3 + \rho_1 \sin \alpha_1 \quad (7)$$

If $$c = \cos \phi, s = \sin \phi \quad (8)$$

it is true that $A \cdot c + B \cdot s + C = 0$, $c^2 + s^2 = 1$.

The solution to this system of equations gives $$c \equiv \cos\varphi = \frac{-AC \pm B\sqrt{A^2 + B^2 - C^2}}{A^2 + B^2}, \quad (9)$$

$$s \equiv \sin\varphi = \frac{-BC \mp A\sqrt{A^2 + B^2 - C^2}}{A^2 + B^2}$$

Substitution in $c^2+s^2=1$ shows that only either the two upper or the two lower choices of the sign are permissible in (9), and two solutions therefore follow.

Thus, the equations (1), (2), (7), (9) and (3) are used, i.e. in succession, for the explicit calculation of the position vector d.

For the parallel determination of location and alignment, 6 degrees of freedom have to be determined. In the equations below, vector components are written as superscripts, where $$v_i := \frac{r_i}{\|r_i\|}$$

represents the direction vector to the i th reference point and the projection of $e_3$ onto the plane defined by $\bar{e}_1$ and $\bar{e}_2$, measured by an inclination sensor, being designated according to $$\eta^1 := \bar{e}_1^T e_3, \eta^2 := \bar{e}_2^T e_3 ((\eta^1)^2 + (\eta^2)^2 \leq 1)$$

Here, $\{e_1, e_2, e_3\}$ is a fixed orthonormal trihedron and $\{\bar{e}_1, \bar{e}_2, \bar{e}_3\}$ is an orthonormal trihedron fixed relative to the object. The following relationships are furthermore applicable:

$$r_i = \rho_i v_i = \rho_i \cdot \sum_{j=1}^{3} \bar{v}_i^j \bar{e}_j = \rho_i \cdot \sum_{j=1}^{3} \bar{v}_i^j E e_j$$

$$E = [\bar{e}_1 \ \bar{e}_2 \ \bar{e}_3] \in R^{3\times3}, \bar{v}_i = [\bar{v}_i^1, \bar{v}_i^2, \bar{v}_i^3]^T \in R^3$$

If inclinations are measured by means of an inclination sensor, for example, position d∈R³ and rotational position E∈SO(3) can be calculated by means of the equations $$w := \sum_{j=1}^{3} (\rho_1 \bar{v}_1^j - \rho_2 \bar{v}_2^j) e_j = : \sum_{j=1}^{3} w^j e_j \qquad (10)$$

$$E = \frac{P_{e_3}^\perp (x_1 - x_2)[w - (x_1^3 - x_2^3)\eta]^T +}{(x_1^1 - x_2^1)^2 + (x_1^2 - x_2^2)^2} + e_3\eta^T \qquad (11)$$

$$d = \frac{1}{|I|} \sum_{i \in I} \left( x_i - \rho_i \sum_{j=1}^{3} \bar{v}_i^j E(:,j) \right) \qquad (12)$$

here, I is the index quantity and |I| is the number of reference points used for the measurement.

Instead of the equation (11), it is also possible to use the following equations:

$$\bar{e}_1 = \frac{[w^1 - (x_1^3 - x_2^3)\eta^1][(x_1^1 - x_2^1)e_1 + (x_1^2 - x_2^2)e_2] - (\eta^2 w^3 - \eta^3 w^2)[(x_1^2 - x_2^2)e_1 - (x_1^1 - x_2^1)e_2]}{(x_1^1 - x_2^1)^2 + (x_1^2 - x_2^2)^2} + \eta^1 e_3$$

$$\bar{e}_2 = \frac{[w^2 - (x_1^3 - x_2^3)\eta^2][(x_1^1 - x_2^1)e_1 + (x_1^2 - x_2^2)e_2] - (\eta^3 w^1 - \eta^1 w^3)[(x_1^2 - x_2^2)e_1 - (x_1^1 - x_2^1)e_2]}{(x_1^1 - x_2^1)^2 + (x_1^2 - x_2^2)^2} + \eta^2 e_3$$

$$\bar{e}_3 = \frac{[w^3 - (x_1^3 - x_2^3)\eta^3][(x_1^1 - x_2^1)e_1 + (x_1^2 - x_2^2)e_2] - (\eta^1 w^2 - \eta^2 w^1)[(x_1^2 - x_2^2)e_1 - (x_1^1 - x_2^1)e_2]}{(x_1^1 - x_2^1)^2 + (x_1^2 - x_2^2)^2} + \eta^3 e_3$$

If a determination is carried out without using an inclination sensor, the following equations can be used:

$$w_{ik} = \sum_{j=1}^{3} (\rho_i \bar{v}_i^j - \rho_k \bar{v}_k^j) e_j \quad (1 \le i < k \le |I|)$$

$$E = \frac{1}{\|x_1 - x_2\|^2 \|x_1 - x_3\|^2 - ((x_1 - x_2)^T (x_1 - x_3))^2}$$
$$\{(x_1 - x_2)[\|x_1 - x_3\|^2 w_{12} - ((x_1 - x_2)^T (x_1 - x_3)) w_{13}]^T +$$
$$(x_1 - x_3)[\|x_1 - x_2\|^2 w_{13} - ((x_1 - x_2)^T (x_1 - x_3)) w_{12}]^T +$$
$$((x_1 - x_2) \times (x_1 - x_3))(w_{12} \times w_{13})^T\}$$

$$d = \frac{1}{|I|} \sum_{i \in I} \left( x_i - \rho_i \sum_{j=1}^{3} \bar{v}_i^j E(:,j) \right)$$

In the figures the steps of the method, buildings and instruments used are shown purely schematically. In particular, no size relationships or details of the image processing or surveying of the reference points are evident from the diagrams. The points shown only by way of example as reference points also represent more complex structures or the elements which make a point detectable.

The invention claimed is:

1. A method for determining a spatial position of a hand-held measuring appliance, wherein a quantity of reference points have been made detectable, the quantity of reference points comprising at least two reference points, and wherein the hand-held measuring appliance is configured to detect and measure the reference points by means of laser radiation, the method comprising the following acts:
    deriving positions of the reference points by surveying the reference points from at least one known initial position;
    automatically detecting and deriving location information relative to at least one first and one second reference point from the quantity of reference points using the measuring appliance, wherein at least one spatial segment is automatically scanned in a scanning movement by the laser radiation to detect the first and second reference points; and
    wherein the location information for at least the detected first and second reference points is derived by measuring at least:
        the distance between the measuring appliance and the first reference point; and
        the distance between the measuring appliance and the second reference point and/or the angle ($\gamma$) between the first and second reference points; and
        the angle of inclination ($\alpha$, $\beta$) to the first or to the second reference point; or
        at least one distance to a third reference point; and
    deriving an actual position of the measuring appliance from the location information and the positions of at least the first and second reference point.

2. The method of claim 1, further comprising repeating at least one of the acts of claim 1.

3. A method according to claim 1, wherein in the automatic detection and derivation of location information:
    at least an inclination of the measuring appliance is derived;
    an emission direction of the laser radiation is determined indirectly or directly; and/or
    an actual orientation of the measuring appliance is derived.

4. A method according to claim 3, wherein the emission direction is determined by configuring a defined trajectory.

5. A method according to claim 1, wherein the first and second reference points are detected on the basis of their reflectivity of the laser radiation.

6. A method according to claim 5, wherein the first and second reference points are detected on the basis of their reflectivity of the laser radiation by using cooperative targets for establishing the reference points.

7. A method according to claim 1, wherein the automatic detection includes distinguishing the reference points from one another by recognition of individual codes or individual physical properties coordinated with each reference point.

8. A method according to claim 7, wherein the points are distinguished on the basis of spectral selectivity.

9. A method according to claim 1, wherein the act of automatic detection and derivation of location information includes recording of images.

10. A method according to claim 9, wherein the first and/or second reference points are detected using image processing methods.

11. A method according to claim 9, wherein the location information for at least the detected first and second reference points is derived using image processing methods.

12. A method according to claim 1, wherein the scanning movement is effected in a substantially rosette or zig zag manner.

13. A method according to claim 1, wherein the act of automatic detection includes automatic target tracking of at least one of the reference points.

14. A method according to claim 1, wherein the location information and/or the alignment information for at least the detected first and second reference points are simultaneously derived.

15. A method according to claim 1, further comprising the act of deriving the actual position and/or an actual orientation by means of inertial sensors.

16. A method according to claim 15, wherein the act of deriving the actual position and/or actual orientation by means of inertial sensors includes interpolation of the actual position and/or of the actual orientation.

17. A method according to claim 1, wherein at least one of the distances is measured according to one of the following principles:
   phase measurement;
   pulse transit time measurement;
   pulse transit time measurement with threshold value determination; or
   pulse transit time measurement with HF sampling.

18. A method according to claim 1, further comprising the act of correcting deviations of a positioning and/or orientation measuring device based on inertial sensors.

19. A method according to claim 18, wherein the deviations include drift effects.

20. A method according to claim 1, further comprising:
   marking processing positions;
   defining a first actual position as a start position;
   defining a second actual position as an end position, wherein processing positions are automatically derived according to a specified scheme between start position and end position.

21. A method according to claim 20, further comprising verifying a processing position by performing the method of claim 1.

22. A measuring appliance configured to perform the method of claim 1.

23. A measuring appliance comprising:
   a laser radiation source for producing laser radiation;
   a measuring component configured to automatically detect reference points which have been made detectable, the measuring component further configured to derive location information of the reference points, the measuring component comprising a receiver configured to receive the laser radiation, the receiver being configured to measure distance;
   a control component configured to change the emission direction of the laser radiation, the control component being configured so that at least one spatial segment is automatically scanned by laser radiation; and
   a position component configured to derive the actual position of the measuring appliance from the location information of the reference points, wherein the measuring appliance is sized and configured to be hand-held.

24. A measuring appliance according to claim 23, wherein the measuring component is further configured to derive the positions of the reference points.

25. A measuring appliance according to claim 23, wherein the measuring component is configured to measure angles.

26. A measuring appliance according to claim 25, wherein the measured angles are between two reference points, between a reference point and the horizontal, and/or between the measuring appliance and the horizontal.

27. A measuring appliance according to claim 23, wherein the measuring component is configured to determine the emission direction of the laser radiation relative to an axis of the measuring appliance.

28. A measuring appliance according to claim 23, further comprising inertial sensors.

29. A measuring appliance according to claim 23, wherein the control component includes a scanner.

30. A measuring appliance according to claim 29, wherein the scanner includes at least one rotatable prism or mirror.

31. A measuring appliance according to claim 23, wherein the measuring component includes an image-recording component.

32. A measuring appliance according to claim 31, wherein the image-recording component includes a CCD or CMOS camera.

33. A measuring appliance according to claim 31, wherein the image-recording component includes a wide-angled camera.

34. A measuring appliance according to claim 23, wherein the measuring component includes a scanning detection component.

35. A measuring appliance according to claim 34, wherein the scanning detection component includes a coaxial optical system.

36. A measuring appliance according to claim 34, wherein the scanning detection component includes an endoscope.

37. A measuring appliance according to claim 23, further comprising a telemeter.

38. A measuring appliance according to claim 23 wherein the control component is configured to vary the extent of the spatial segment.

39. A measuring appliance according to claim 23, wherein the control component is configured to scan at least two spatial segments independently of one another.

40. A measuring appliance according to claim 39, wherein the control component includes two trackers for target tracking.

41. A measuring appliance according to claim 23, further comprising a display for confirming that the measuring appliance has assumed a predetermined position.

42. A measuring appliance according to claim 41, further comprising a computing component configured to derive predetermined positions.

43. A measuring appliance according to claim 42, wherein the computer component derives the predetermined positions by establishing a start position and an end position between which processing positions are automatically derived by the computing component according to a specified scheme.

44. A local position-determining system comprising a measuring appliance according to claim 23, the local position-determining system further comprising at least two reflectors for establishing reference points which have been made detectable.

45. A local position-determining system according to claim 44, wherein at least one of the reflectors includes one of the following elements:
   a glass sphere, in particular as full spheres or hemispheres,
   a retroreflective foil, or
   a triple prism.

46. A local position-determining system according to claim 45 wherein at least one of the reflectors is an element provided with a coding or a spectral selectability.

* * * * *